United States Patent Office 3,320,093
Patented May 16, 1967

3,320,093
METHOD OF FORMING A CARBON CONTAINING FUEL CELL ELECTRODE
William A. Harding, Media, Pa., Saul Gerald Hindin, Wilmington, Del., and Harold Shalit, Drexel Hill, Pa., assignors to Air Products and Chemicals, Inc., Philadelphia, Pa., and Northern Natural Gas Company, Omaha, Nebr., both corporations of Delaware
No Drawing. Filed Apr. 1, 1963, Ser. No. 269,800
7 Claims. (Cl. 136—122)

This invention relates to improvements in the electrodes of a fuel cell for the generation of electrical energy through the electrochemical oxidation of fuels, such as hydrogen, hydrocarbons, alcohols, carbonyl compounds and the like.

The preparation of fuel cell electrodes by forming a solid, porous carbonaceous body of the desired electrode shape from any of a number of commercial or research grades of baked carbon or graphite, with or without the subsequent addition thereto of catalytic materials having special characteristics for promoting the desired electrochemical oxidation, is well known.

Among the catalytically active components that have heretofore been employed to enhance the activity of fuel cell electrodes are metals of the platinum group for acid systems, and the same or other metals for alkaline systems. Such metals are readily applied to the porous electrode body by known impregnation techniques involving the use of aqueous salt solutions of the particular metal. Thus, in using platinum as the catalyzing agent, the metal may be added as chloroplatinic acid. In using palladium, the metal may be added as palladium chloride, these examples being merely typical. Subsequent reduction treatment leaves the pure metal deposited upon the surface and within the pores of the porous body.

Electrodes thus formed may be employed to advantage in fuel cells operating with an acid electrolyte, such as 30 weight percent sulfuric acid solution, or with an alkaline electrolyte such as potassium hydroxide.

Experience has shown, however, that while such electrodes may prove satisfactory when used as the anode, or fuel side of the fuel cell, they have not proved to be as satisfactory for the cathode, or oxygen side of the cell, that is, as the oxygen electrode. In such latter use in an acid system, the electrodes have generally exhibited unsatisfactory polarization characteristics under any appreciable current density or load.

It has been observed that carbonaceous material derived from the direct decomposition of hydrocarbons and deposited directly upon a suitable support material, which may be porous or non-porous, is quite susceptible to catalytic enhancement by the aforementioned impregnation techniques.

In accordance with the invention, a fuel cell electrode of improved efficiency is formed by thermally decomposing, in the presence of an electrode body of relatively-inert, conductive material, a dissociable carbon-containing compound, which may be a hydrocarbon, particularly one which is more readily coked, such as an olefin, so as to progressively deposit upon the surface of the electrode body a porous carbonaceous layer, and distributing upon the surface and within the pore structure of said layer a metallic material having the desired activating characteristics and being substantially non-reactive with the particular acidic or basic electrolyte.

The catalytic metallic material deposited upon the surface and incorporated within the pore structure of the active carbon layer deposited upon the electrode body may be applied concomitantly with the deposited carbon or as a separate step subsequent to the carbon deposition. In the former case, the carbon-containing material which is thermally decomposed may be a complex compound comprising also the metal to be applied as the catalytic agent, such as tetraalkyl platinum the alkyl groups each having preferably 1 to 4 carbon atoms. In the latter case, the porous active carbon layer may first be applied and then be impregnated with a solution of a salt or complex of the desired metal, for example the salt or complex of a noble metal of the platinum group, such as chloroplatinic acid, palladium chloride, platinum ethylene complex, tetraethyl or tetramethyl platinum, etc., the impregnant then being reduced to leave the active metal deposited in and upon the active carbon.

Dependent upon the particular materials selected, the thermal decomposition of the carbon-containing compound or complex may be carried out at temperatures in the range of 200–1400° C. and at pressures from atmospheric up to about 1000 p.s.i.g.

As supports for the active carbon and the metallic catalyst, it is contemplated that various porous or non-porous materials may be employed. For example, the electrode body or support may be in the form of a carbon or graphite cloth, a rigid body of commercial grade carbon or graphite, or it may comprise a metal wire, screen or mesh.

In order to demonstrate the practicability of the invention a number of electrodes were prepared in accordance with the described method and were then subjected to a series of comparative tests in a standard half-cell unit to determine polarization characteristics. Data concerning the electrode and its method of formation, as well as the testing thereof, are given below.

*Experiment I*

A number of circular discs, approximately 2.86 cm. in diameter, were cut from a piece of commercial graphite cloth. Five of the discs were subjected to carbonization treatment as follows:

The discs were placed within an elongated tube which was set in a high temperature furnace, with the open ends of the tube projecting at opposite sides of the furnace. The discs were placed so that gaseous material could flow through and around them. The tube was then purged with nitrogen, and heat was applied, with nitrogen still flowing, until the temperature was raised to about 675° C. The flow of nitrogen was then cut off and isobutene, at the same high (675° C.) temperature, was passed through the tube at a rate of 30 cc./min. After the isobutene had been flowing for one hour, the heat supply was cut off and the furnace was permitted to cool down gradually, with isobutene still flowing through the tube. The rate of cooling was such that the furnace reached a temperature of about 150° C. within 40 minutes. At this time, the flow of isobutene was discontinued and purging with nitrogen was resumed and continued until approximately ambient temperature was reached, that is, about 35–40° C.

The five discs had been weighed before the carbonization treatment, and they were again weighed after carbonization. The initial total weight of the untreated discs was .3567 gm. and the total weight of the treated discs was .3586 gm., thus indicating a total carbon deposit on the five discs of 1.9 mg. The carbon deposit was therefore 0.38 mg. per disc, which amounted to about 0.06 mg./cm.$^2$ of geometric or circular area.

The carbonized discs of graphite cloth, as well as the uncarbonized discs which had been set aside, were then each placed in separate containers and impregnated with chloroplatinic acid solution in such amount and of such concentration as to deposit about 3.9 mg./cm.$^2$ of platinum thereon. The wetted, carbonized and uncarbonized discs were then evaporated to dryness, leaving the platinum compound deposited upon the cloth. The graphite cloth discs were again placed in a tube which was set with its ends projecting through a low temperature furnace. The temperature in the tube was raised to about 88° C. and wet hydrogen was passed through the tube at atmospheric pressure to reduce the platinum salt to the metal, that is, to platinum. The catalyst-impregnated graphite cloth discs were then washed with distilled water to ready them for testing in the oxygen half-cell.

Both the uncarbonized and the carbonized discs were then tested in the half-cell unit at 55° C. and with 3.7 molar sulfuric acid as the electrolyte. Five of each type of disc were placed face-to-face to form composite electrodes. Oxygen was fed to the cell at a rate of 50 cc./min. and continued for about 15 hours. The results of a series of such long life tests at different current densities are tabulated below.

TABLE 1

| Uncarbonized discs | | Carbonized discs | |
| --- | --- | --- | --- |
| Current (ma./cm.$^2$) | Polarization (volts) | Current (ma./cm.$^2$) | Polarization (volts) |
| oC | .36 | oC | .31 |
| 0.39 | .49 | .40 | .36 |
| 1.3 | .54 | 1.3 | .40 |
| 2.9 | .59 | 3.1 | .45 |
| 6.0 | .65 | 6.5 | .53 |
| 10.3 | .70 | 10.3 | .59 |
| 15.2 | .76 | 19.6 | .73 |

From the foregoing data it is evident that there is an appreciable decrease in polarization at each current density, with about 0.1 volt decrease in polarization at a current density of about 10 ma./cm.$^2$.

To determine the practicability of the invention as applied also to the activation of non-porous bodies, such as metal wires or screens, a number of circular disc electrodes of about 2.86 cm. (1⅛") diameter were cut from 80 mesh (U.S. Standard) platinum wire screen.

*Experiment II*

Three of the platinum mesh discs were juxtaposed to form a single composite electrode and were tested in the aforementioned standard half-cell unit at 55° C. and with an oxygen feed of 50 cc./min. The electrode rapidly showed almost complete polarization under a constant light load of less than 0.5 ma./cm.$^2$.

These and other platinum mesh discs were then carbonized by using the technique employed in preparing the graphite cloth discs of Experiment I.

*Experiment III*

Three of the carbonized platinum mesh discs were then tested as in Experiment II, and, again, the composite electrode showed almost complete polarization at constant current densities of less than 0.5 ma./cm.$^2$.

These and other carbonized platinum mesh discs were then impregnated with an aqueous chloroplatinic acid solution having a platinum concentration of 49 mg./cc. After soaking in the solution for one hour the discs were removed and evaporated to dryness at 60° C. over a period of at least 12 hours. The discs were then reduced in the same manner as the graphite cloth discs and were washed with distilled water in preparation for testing.

*Experiment IV*

Three of the platinum-impregnated, carbonized, platinum mesh discs were tested separately in the half-cell test unit. While each displayed much better polarization characteristics than did the composite carbonized platinum mesh electrode of Experiment III, they all showed almost complete polarization under constant light loads of less than 2.5 ma./cm.$^2$.

*Experiment V*

The three carbon-on-platinum discs used in Experiment IV were then juxtaposed to form a single composite electrode, as in Experiment II, and the electrode was tested in the half-cell test unit. This three-layer electrode showed a marked improvement in polarization characteristics over the composite, uncarbonized platinum electrode in Experiment II, the composite carbon-on-platinum electrode of Experiment III and the individual platinum-on-carbon-on-platinum electrodes of Experiment IV. While the composite platinum (uncarbonized) electrode, the composite carbonized platinum electrode, and the individual (single screen) platinum-activated, carbonized electrodes all showed a polarization in excess of 0.8 v. at current densities below 2 ma./cm.$^2$, the composite, platinum-activated, carbonized electrode was able to carry a current density of 14–15 ma./cm.$^2$ before reaching such polarization level.

An additional experiment along the lines of Experiments III and IV was then carried out to confirm the conclusions drawn from the previous experiment and to further determine the benefits of multi-layering of the mesh screens to form composite electrodes.

*Experiment VI*

To further demonstrate the effectiveness of platinized active carbon on a solid conductive support, and of multi-layering thin screen or mesh electrode elements to form a composite electrode body, the following experiment was conducted.

Five platinum screen discs (80 mesh, U.S. Standard) of 2.86 cm. (1⅛") diameter were carbonized by the procedure followed in the previous platinum mesh experiments, that is, by thermal decomposition of isobutene at 675° C. and at a hydrocarbon feed rate of 30 cc./min. for one hour. Upon cooling to room temperature the total carbon deposite was found to be 13.1 mg.

The carbonized platinum mesh discs were then soaked for about one hour in 4 cc. of chloroplatinic acid solution having a platinum concentration of 100 mg./cc. The discs were then removed and dried at 60° C. This was followed by reduction treatment with wet hydrogen at 200° F. for 24 hours and water washing to remove the formed chlorides and other impurities. By measurement it was found that a total of 11.1 mg. of platinum had been deposited on the five discs. This calculated to be 1.7 mg./cm.$^2$ of geometric area of the composite electrode formed by juxtaposing the five discs, each disc having a geometric area of 6.43 cm.$^2$.

The composite 5-screen electrode was then tested in the half-cell test unit and showed improved polarization characteristics compared to any of the other electrodes. The electrode showed a polarization of less than 0.55 v. at a current density of 10 ma./cm.$^2$.

The tests were then repeated after each removal of one screen from the composite electrode. With each screen removal there was found to be a progressive deterioration in polarization characteristics for the same current densities, about 0.05 v. per screen removal, except for the final test of a single screen. Here the polarization was almost complete at a current density of 10 ma./cm.$^2$.

From the foregoing experiments it was determined that the most efficient utilization of the improved method was obtained with platinized active carbon on a solid conductive surface of material which would be compatible with the particular electrolyte to be employed.

While the platinized active carbon on graphite cloth provided an efficient electrode, the amount of platinum absorbed by the graphite was considerably higher than that which adhered to the platinum mesh during the chloroplatinic acid impregnation treatment. Thus, while the graphite cloth showed a total platinum deposit of 3.9 mg./cm.$^2$, the platinum mesh received a platinum deposit of 1.7 mg./cm.² and showed a desirable decrease in polarization of about 0.1 v.

Since the five platinum screens weighed 1.840 gm., or about, .368 gm. per screen, and since the platinum mesh screens alone, that is, without carbonization, showed extremely poor polarization characteristics, a need for maximum economy in electrode cost would require that a solid conductive material other than platinum be employed as the support, or, at least, that a solid material other than platinum which may not itself be conductive but is provided with a conductive surface material to be employed.

Obviously, many modifications and variations of the invention as hereinbefore set forth may be made without departing from the spirit and scope thereof, and therefore only such limitations should be imposed as are indicated in the appended claims.

What is claimed is:

1. The method of forming a fuel cell electrode, which comprises the steps of: placing a relatively-inert, conductive electrode in a heating zone; purging said heating zone with inert gas while heating said body to a temperature of 200–1400° C.; exposing the heated body, at a pressure of from atmospheric to 1,000 p.s.i.g., to a gaseous carbon-containing compound dissociable under such conditions for a period of time sufficient to progressively deposit upon the surface of said body a relatively thin layer of porous active carbon; removing the source of heat and gradually cooling said body to a temperature of about 150° C., with continuing exposure of said body to said carbon-containing compound; discontinuing the exposure of said body to said carbon-containing compound and again purging said zone with said inert purging medium while returning said body to ambient conditions of temperature and pressure; impregnating the carbon coated body with an aqueous solution of a compound containing an active metal of the platinum group; and reducing said compound to deposit said active metal upon the impregnated surface areas of said body.

2. The method as in claim 1, in which said carbon-containing compound is an olefinic hydrocarbon, the temperature to which said body is heated is in the order of about 675° C., and the pressure maintained within said heating zone is substantially atmospheric.

3. The method as in claim 2, in which said hydrocarbon is isobutene and said purging medium is nitrogen.

4. The method as in claim 3, in which said aqueous solution is chloroplatinic acid solution.

5. The method as in claim 1, in which said electrode body is in the form of a woven mesh.

6. The method as in claim 5, in which said mesh is composed of graphite cloth.

7. The method as in claim 5, in which said woven mesh is composed of platinum wire.

References Cited by the Examiner

UNITED STATES PATENTS

| | | | |
|---|---|---|---|
| 2,758,940 | 8/1956 | Baker et al. | 136—122 X |
| 2,764,510 | 9/1956 | Ziegler | 117—466 X |
| 2,798,051 | 7/1957 | Bicek | 117—107.2 X |
| 3,071,637 | 1/1963 | Horn et al. | 136—122 X |
| 3,077,508 | 2/1963 | Oswin | 136—122 X |
| 3,097,974 | 7/1963 | McEvoy et al. | 136—86 X |
| 3,159,658 | 12/1964 | Fischer et al. | 260—429 |
| 3,164,487 | 1/1965 | Carley-Macauly et al. | 117—66 |
| 3,188,230 | 6/1965 | Bakish et al. | 117—107.2 X |
| 3,198,666 | 8/1965 | Gruneberg et al. | 136—86 |

WINSTON A. DOUGLAS, *Primary Examiner.*

ALLEN B. CURTIS, *Examiner.*